United States Patent
Sayama

(10) Patent No.: US 11,554,702 B2
(45) Date of Patent: Jan. 17, 2023

(54) LATCH DEVICE FOR VEHICLE

(71) Applicant: TS TECH CO., LTD., Asaka (JP)

(72) Inventor: Tatsuo Sayama, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 961 days.

(21) Appl. No.: 16/337,764

(22) PCT Filed: Mar. 30, 2017

(86) PCT No.: PCT/JP2017/013382
§ 371 (c)(1),
(2) Date: Mar. 28, 2019

(87) PCT Pub. No.: WO2018/061266
PCT Pub. Date: Apr. 5, 2018

(65) Prior Publication Data
US 2020/0001763 A1   Jan. 2, 2020

(30) Foreign Application Priority Data
Sep. 30, 2016   (JP) .............................. JP2016-192999

(51) Int. Cl.
*B60N 2/90*      (2018.01)
*B60N 2/20*      (2006.01)
(Continued)

(52) U.S. Cl.
CPC .............. *B60N 2/933* (2018.02); *B60N 2/20* (2013.01); *B60N 2002/952* (2018.02); *E05B 85/243* (2013.01); *E05C 3/004* (2013.01)

(58) Field of Classification Search
None
See application file for complete search history.

(56) References Cited

U.S. PATENT DOCUMENTS 5,454,608 A * 10/1995 Dzurko .................. E05B 81/16
                                               292/216
5,803,515 A *  9/1998 Arabia, Jr. ............. E05B 81/16
                                               292/201
(Continued)

FOREIGN PATENT DOCUMENTS

JP       2011098585        5/2011
JP       2013226993       11/2013
(Continued)

OTHER PUBLICATIONS

Japanese Office Action, issued in the corresponding Japanese Patent Application No. 2016-192999, dated Jun. 2, 2020, 5 pages (including English translation).

(Continued)

*Primary Examiner* — David E Allred
(74) *Attorney, Agent, or Firm* — Hamre, Schumann, Mueller & Larson, P.C.

(57) ABSTRACT

A latch device for a vehicle includes an engageable member having an engageable notch engageable with a striker, a shaft member by which the engageable member is rotatably supported, a first body including a first support portion by which one end of the shaft member is supported, and a second body including a coupling portion coupled to the first body, and a second support portion by which another end of the shaft member is supported. The engageable member is rotatable about the shaft member between a first position in which engagement with the striker is achievable and a second position in which disengagement from the striker is permitted. With the first body, an entrance of the engageable notch through which the striker comes in the engageable notch in a state where the engageable member is in the first position is covered from one side in an axial direction of the shaft member. With the second body, the engageable notch in the state where the engageable member is in the first (Continued)

position is not covered, but left uncovered in entirety, from another side in the axial direction of the shaft member.

10 Claims, 7 Drawing Sheets

(51) Int. Cl.
E05B 85/24 (2014.01)
E05C 3/00 (2006.01)

(56) References Cited

U.S. PATENT DOCUMENTS

| | | | |
|---|---|---|---|
| 5,975,596 A * | 11/1999 | Rogers, Jr. | E05B 85/243 |
| | | | 292/216 |
| 6,427,500 B1 * | 8/2002 | Weinerman | E05B 79/20 |
| | | | 296/100.1 |
| 9,039,089 B2 | 5/2015 | Ohba | |
| 9,533,606 B2 | 1/2017 | Mueller et al. | |
| 9,994,129 B1 * | 6/2018 | Shirokane | B60N 2/2245 |
| 10,471,810 B2 * | 11/2019 | Martin | B60J 5/0416 |
| 2011/0227314 A1 * | 9/2011 | Lowenthal | A61G 5/12 |
| | | | 297/378.1 |
| 2013/0285430 A1 | 10/2013 | Ohba | |
| 2014/0306507 A1 | 10/2014 | Mueller et al. | |
| 2015/0240538 A1 * | 8/2015 | Mittelbach | E05B 77/34 |
| | | | 292/195 |
| 2017/0327012 A1 * | 11/2017 | Schug | B60N 2/2245 |
| 2018/0056825 A1 * | 3/2018 | Rapedius | B60N 2/36 |
| 2019/0032373 A1 * | 1/2019 | Taga | E05B 85/02 |
| 2021/0122277 A1 * | 4/2021 | Tachikawa | B60N 2/366 |
| 2022/0090427 A1 * | 3/2022 | Choi | E05B 85/243 |

FOREIGN PATENT DOCUMENTS

| | | | | |
|---|---|---|---|---|
| JP | 2014061781 A * | 4/2014 | | B60N 2/005 |
| JP | 2014514983 | 6/2014 | | |
| JP | 2014201880 | 10/2014 | | |
| JP | 5632180 | 11/2014 | | |
| JP | 2015057535 | 3/2015 | | |
| JP | 2016078727 | 5/2016 | | |

OTHER PUBLICATIONS

Office Action issued for Chinese Patent Application No. 201780060850.2, dated Jun. 3, 2021, 11 pages including English translation.
International Search Report issued for International Patent Application No. PCT/JP2017/013382, dated May 23, 2017, 5 pages including English translation.

* cited by examiner

FIG.5
(a)
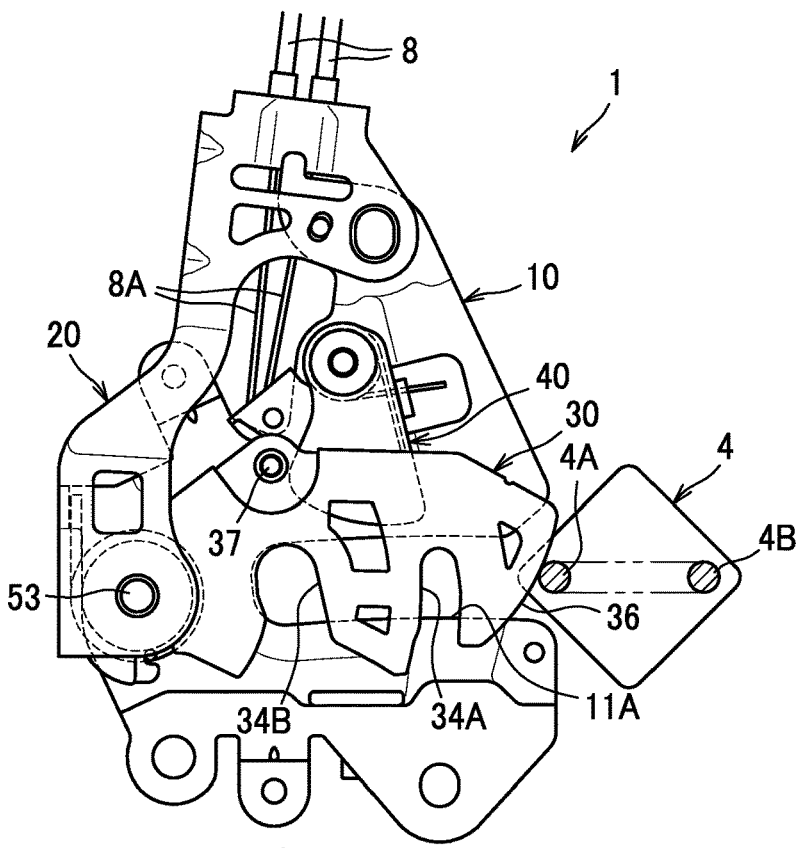
(b)
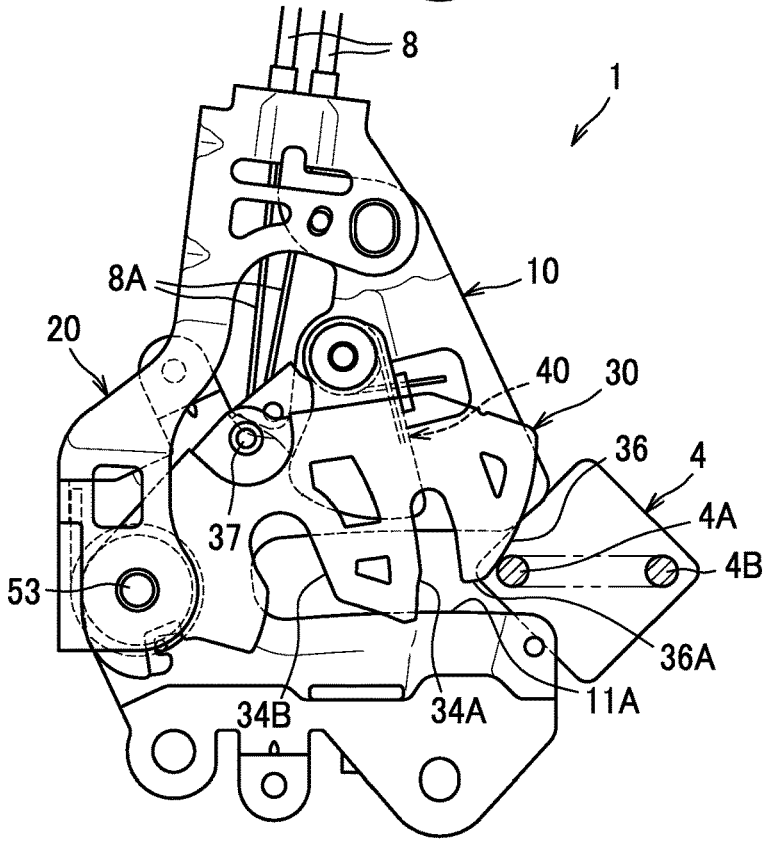

FIG.6
(a)
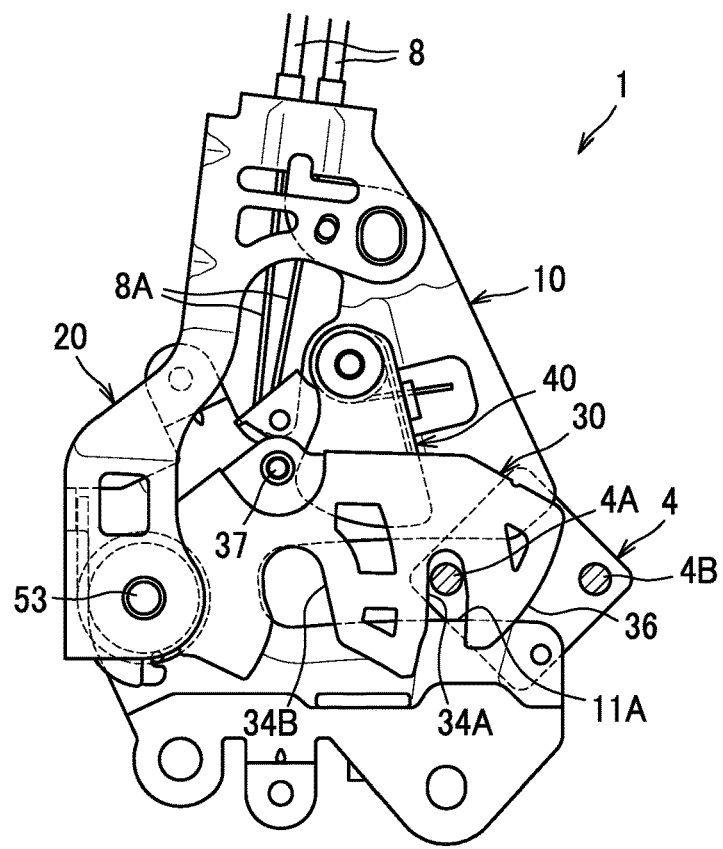
(b)
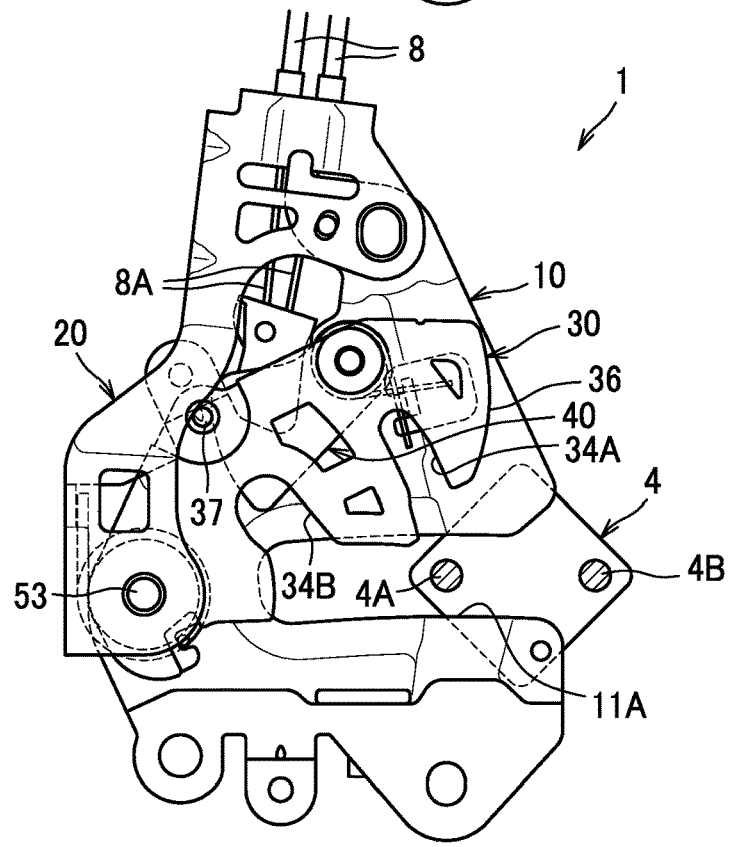

LATCH DEVICE FOR VEHICLE

TECHNICAL FIELD

The present invention relates to a latch device for a vehicle.

BACKGROUND ART

In a seat of which a seat cushion and/or a seat back are rendered rotatable relative to a vehicle body, their positions are fixed by a latch device. To be more specific, a striker is fixed to one of the vehicle body and the seat while the latch device is fixed to the other, so that the seat is locked and kept still in motion by a hook of the latch device engaged with the striker.

CITATION LIST

Patent Literature

Patent Document 1: JP 5632180 B2

SUMMARY OF INVENTION

In recent years, with a growing demand for weight reduction of a car for improved fuel efficiency or other purposes, there has been a growing demand for weight reduction of a latch device for use in a car.

With this in view, it is an object of the present invention to provide a latch device for a vehicle in which reduction in weight is achieved.

It is another object of the present invention to ensure rigidity of a latch device for a vehicle.

The present invention envisaged addressing the aforementioned problems is embodied in a latch device for a vehicle, which comprises: an engageable member having an engageable notch engageable with a striker; a shaft member by which the engageable member is rotatably supported; a first body including a first support portion by which one end of the shaft member is supported; and a second body including a coupling portion coupled to the first body, and a second support portion by which another end of the shaft member is supported, wherein the engageable member is rotatable about the shaft member between a first position in which engagement with the striker is achievable and a second position in which disengagement from the striker is permitted.

With the first body, an entrance of the engageable notch through which the striker comes in the engageable notch is covered from one side in an axial direction in a state where the engageable member is in the first position.

With the second body, the engageable notch is not covered, but left uncovered in entirety, from another side in the axial direction in the state where the engageable member is in the first position.

With this configuration, the second body configured to leave the engageable notch uncovered in entirety may thus be made smaller, so that the latch device for a vehicle can be made lighter in weight. Moreover, before it is mounted in the vehicle, the assembly condition of the engageable member or other parts can be visually inspected with increased ease.

The above-described latch device for a vehicle may be configured that with the second body, the engageable notch is not covered, but left uncovered in entirety, from said another side in the axial direction in a state where the engageable member is in the second position.

With this configuration, the latch device for a vehicle can be made much lighter in weight. Moreover, before it is mounted in the vehicle, the operation of the engageable member can be visually inspected with increased ease.

In the above-described latch device for a vehicle, the first body may include a receptacle notch which allows the striker to come therein, a first mounting portion with which a fastening member for attachment of the latch device for a vehicle is engageable, and a second mounting portion with which a fastening member for attachment of the latch device for a vehicle is engageable, the first mounting portion being disposed at one side of the receptacle notch as viewed in the axial direction, the second mounting portion being disposed at another side of the receptacle notch as viewed in the axial direction. In this embodiment, the second body may be configured such that at least a portion of the second body at said one side of the receptacle notch includes no mounting portion with which a fastening member for attachment of the latch device for a vehicle is engageable.

With this configuration, although at least a portion of the second body at said one side of the receptacle notch fails to include a mounting portion, the mounting portions provided in the first body and disposed at the both sides of the receptacle notch are fixed to a vehicle body, a seat frame or the like, so that the positions of the mounting portions are fixed by the vehicle body, the seat frame or the like. In other words, a structure in which the vehicle body, the seat frame or the like together with the first body constitutes a housing of the latch device for a vehicle is provided, and thus the latch device for a vehicle can be made lighter in weight without sacrificing rigidity and strength.

In the latch device for a vehicle, the second body may include a first wall extending in a direction perpendicular to the axial direction to connect the coupling portion and the second support portion, and a second wall extending in a direction along the axial direction from the first wall at a side of the first wall on which the one end of the shaft member is disposed.

With this configuration, although the second body is made smaller, the L-shaped cross section formed by the first wall and the second wall can ensure the rigidity of the latch device for a vehicle.

In the above-described latch device for a vehicle, preferably, the second wall may extend from the first wall throughout an entire region between a first plane and a second plane, where, as viewed in the axial direction, the first plane is perpendicular to a straight line passing through the coupling portion and a center of the shaft member and passes through the center of the shaft member, and the second plane is perpendicular to the straight line and passes through the coupling portion.

With this configuration, the L-shaped cross section is formed throughout the entire region ranging from the center of the shaft member by which the second body is connected to the first body to the coupling portion, so that the rigidity of the latch device for a vehicle can be ensured.

In the above-described latch device for a vehicle, the second body may include a plurality of recesses in an edge formed by the first wall and the second wall.

With this configuration, the first wall and the second wall are connected by the plurality of recesses, and the rigidity of the second body can thus be enhanced.

The above-described latch device for a vehicle may be configured such that the first wall has an engageable hole provided as the coupling portion, and the first body includes a first protrusion engageable in the engageable hole.

With this configuration, relative positions of the first body and the second body can be restricted by using the engagement between the engageable hole and the first protrusion.

The above-described latch device for a vehicle may further comprise a lever member engageable with the engageable member for use in causing the engageable member to rotate.

The lever member is provided with a cable including an inner cable and an outer cable through which the inner cable is disposed, the lever member including a cable engageable portion configured to allow the inner cable to be engaged therewith.

The second body includes a cable hook to which an end portion of the outer cable is hooked.

The cable hook extends in a direction along the axial direction from the first wall at the side of the first wall on which the one end of the shaft member is disposed.

The first wall includes: a first portion in which the engageable hole is formed; and a second portion provided between the first portion and the cable hook, the second portion being recessed from the first portion into the side on which the one end of the shaft member is disposed.

With this configuration, the rigidity of the cable hook on which a force is exerted from the outer cable can be increased by the recessed second portion.

The above-described latch device for a vehicle may be configured such that the second body has an opening provided between the first portion and the second portion, wherein the first body includes a second protrusion disposed in the opening, and is disposed between the first portion and the second portion.

With this configuration, the second protrusion disposed in the opening and disposed between the first portion and the second portion restricts the second body relative to the first body in the direction of thickness of the first wall, and thus serves to enhance the rigidity of the housing constructed of the first body and the second body.

BRIEF DESCRIPTION OF DRAWINGS

FIG. 5 includes views (*a*) and (*b*) for explaining an operation of the latch device for a vehicle.

FIG. 6 includes views (*a*) and (*b*) for explaining an operation of the latch device for a vehicle.

DESCRIPTION OF EMBODIMENTS

Figure 1:
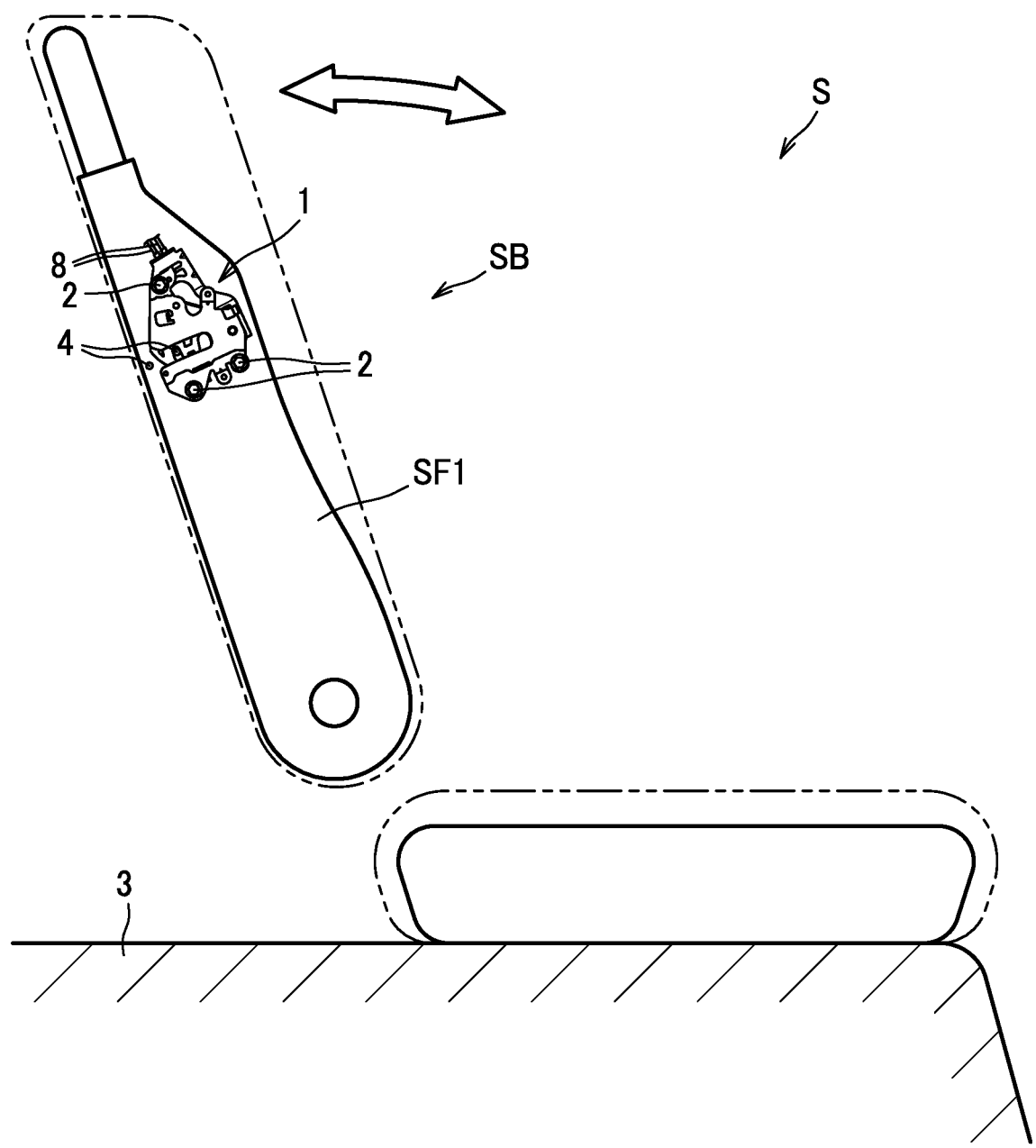
FIG. 1 is a side elevation of a seat frame of a car seat provided with a latch device for a vehicle.
Figure 4:
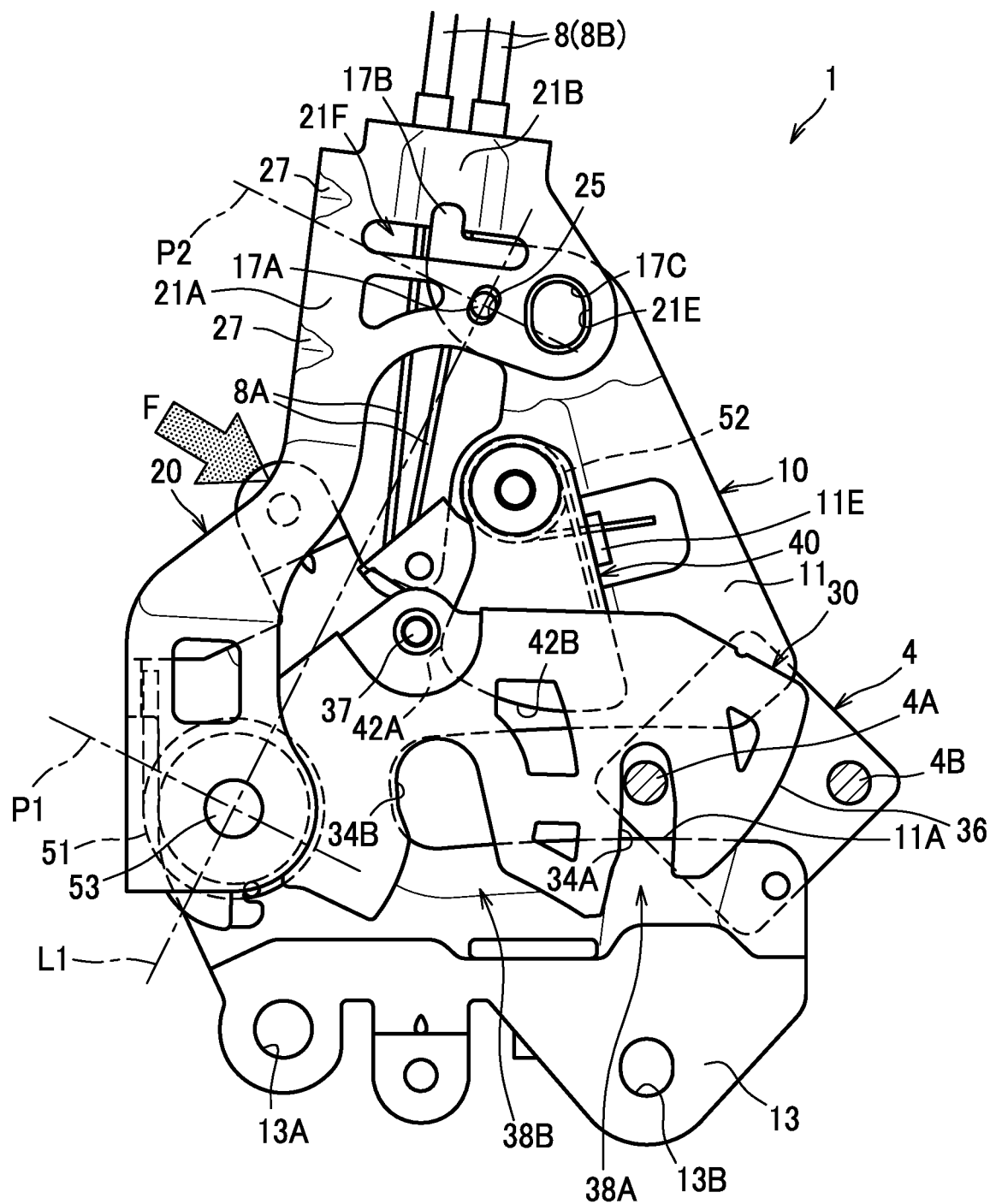
FIG. 4 is a view, as seen from a seat frame side, of the latch device for a vehicle.

Hereafter, a description will be given of an illustrative embodiment of a latch device for a vehicle according to the present invention with reference made to the accompanying drawings. As shown in FIG. 1, a latch device 1 for a vehicle configured according to an illustrative embodiment is fixed by bolts 2, for example, to a side frame SF1 of a seat back SB, which is part of a seat frame S of a car seat such as a rear seat of an automobile. The latch device 1 for a vehicle is engaged with a striker 4 fixed to a vehicle body 3 to thereby make the seat back SB fixed relative to the vehicle body 3, and is disengaged from the striker 4 to thereby render the seat back SB movable relative to the vehicle seat 3. As shown in FIG. 4, end portions of cables 8 each including an inner cable 8A and an outer cable 8B through which the inner cable 8A is disposed are connected to the latch device 1 for a vehicle so that the latch device 1 for a vehicle is operated by pulling the inner cables 8A. The other end portion of each cable 8 is connected to a lever provided on the seat back SB or the vehicle body 3 or a movable part other than the seat back SB.

Figure 2:
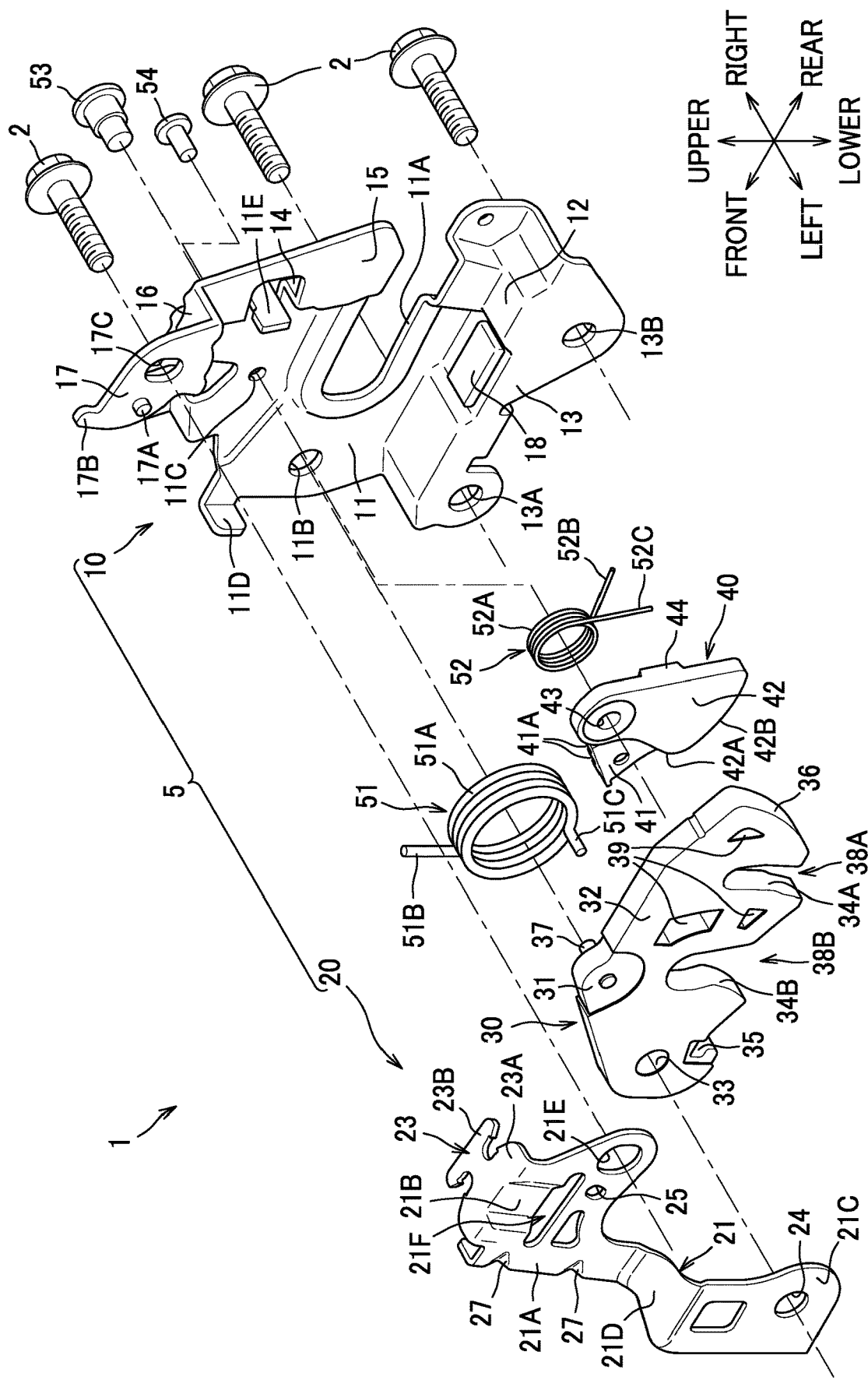
FIG. 2 is an exploded perspective view of the latch device for a vehicle.

As shown in FIG. 2, the latch device 1 for a vehicle includes a housing 5 (comprised of a first body 10 and a second body 20), a hook 30 as an example of an engageable member that is rotatably supported by the housing 5, a lever member 40 that is rotatably supported by the housing 5, and torsion springs 51, 52.

The first body 10 is made by stamping a sheet of metal, and includes a cover portion 11 facing to the hook 30, which cover portion is disposed at a side of the hook 30 facing to one direction along an axis of rotation of the hook 30 (hereinafter referred to simply as "axial direction"). The cover portion 11 includes a receptacle notch 11A which opens toward rearward as in FIG. 2 and extends deep in a front-rear direction. The receptacle notch 11A is a recess which allows the striker 4 to come therein. It is to be noted that in the following description, the upper/lower (upward/downward), left/right (leftward/rightward; lateral), and front/rear (frontward/rearward) directions may be mentioned with reference to the directions indicated in FIG. 2 for convenience in explanation. These directions correspond to the upper/lower (upward/downward; vertical), left/right (leftward/rightward; lateral), and front/rear (frontward/rearward) directions designated with reference to an occupant seated on the car seat. It is however to be understood that the latch device 1 for a vehicle may be used in any orientation chosen as desired.

At one side of the receptacle notch 11A as viewed in the axial direction, i.e., a lower side thereof in the present embodiment, a first sidewall portion 12 extending from a lower end of the cover portion 11 in the other direction (leftward) along the axial direction and a flange 13 extending from a left end portion of the first sidewall portion 12 downward are provided. The flange 13 has two mounting holes 13A, 13B provided separately from each other in the front-rear direction, as a first mounting portion. The mounting holes 13A, 13B are portions in which bolts 2 as an example of a fastening member for attachment of the latch device 1 for a vehicle to the seat frame S are engageable.

At another side of the receptacle notch 11A as viewed in the axial direction, i.e., an upper side thereof in the present embodiment, a second sidewall portion 14 extending from the cover portion 11 leftward substantially along a vertical direction, and a flange 15 extending from a left end portion of the second sidewall portion 14 rearward are provided. The second sidewall portion 14 and the flange 15 have an opening formed by cutting away portions thereof at the center in the vertical direction.

At the upper side of the receptacle notch 11A, a third sidewall portion 16 extending from the cover portion 11 and the flange 15 leftward substantially along the front-rear direction, and an engageable flange 17 extending from a left end of the third sidewall portion 16 upward are provided. The engageable flange 17 includes a first protrusion 17A protruding leftward and a second protrusion 17B protruding upward. The first protrusion 17A has a circular shape as viewed in the axial direction, and is a portion insertable and engageable in an engageable hole 25 of the second body 20 which will be described later. The second protrusion 17B is a portion engageable in an opening 21F of the second body 20 which will be described later.

The engageable flange 17 also has a mounting hole 17C provided in the shape of an elongate hole slightly longer in the vertical direction, as a second mounting portion. The mounting hole 17C is a portion in which a bolt 2 for attachment of the latch device 1 for a vehicle to the seat frame S is engageable.

The cover portion 11 includes a first support hole 11B, a lever support hole 11C, a first spring anchor portion 11D, and a second spring anchor portion 11E. The first support hole 11B is a first support portion by which one end of a shaft member 53 (a member by which the hook 30 is rotatably supported) is supported, and is provided at a front side of the receptacle notch 11A. The lever support hole 11C is a portion by which a pin 54 (a member by which the lever member 40 is rotatably supported) is supported, and is provided at the upper side of the receptacle notch 11A. The first spring anchor portion 11D is a portion by which a first arm 51B of the torsion spring 51 is anchored, and configured to extend from the front end of the cover portion 11 leftward. The second spring anchor portion 11E is a portion by which a first arm 52B of the torsion spring 52 is anchored, and provided at the rear end of the cover member 11, particularly, on an edge of the second sidewall portion 14 along the cutaway opening, and configured to extend from the cover portion 11 leftward.

Moreover, the first sidewall portion 12 is provided with a cushion 18 made of rubber, which is fitted and fixed in a hole (not shown) of the first sidewall portion 12. The cushion 18 is a member with which the hook 30 being rotated downward comes in contact so that the impact and noise which would be caused by collision of the hook 30 with the first body 10 are reduced.

Figure 3:
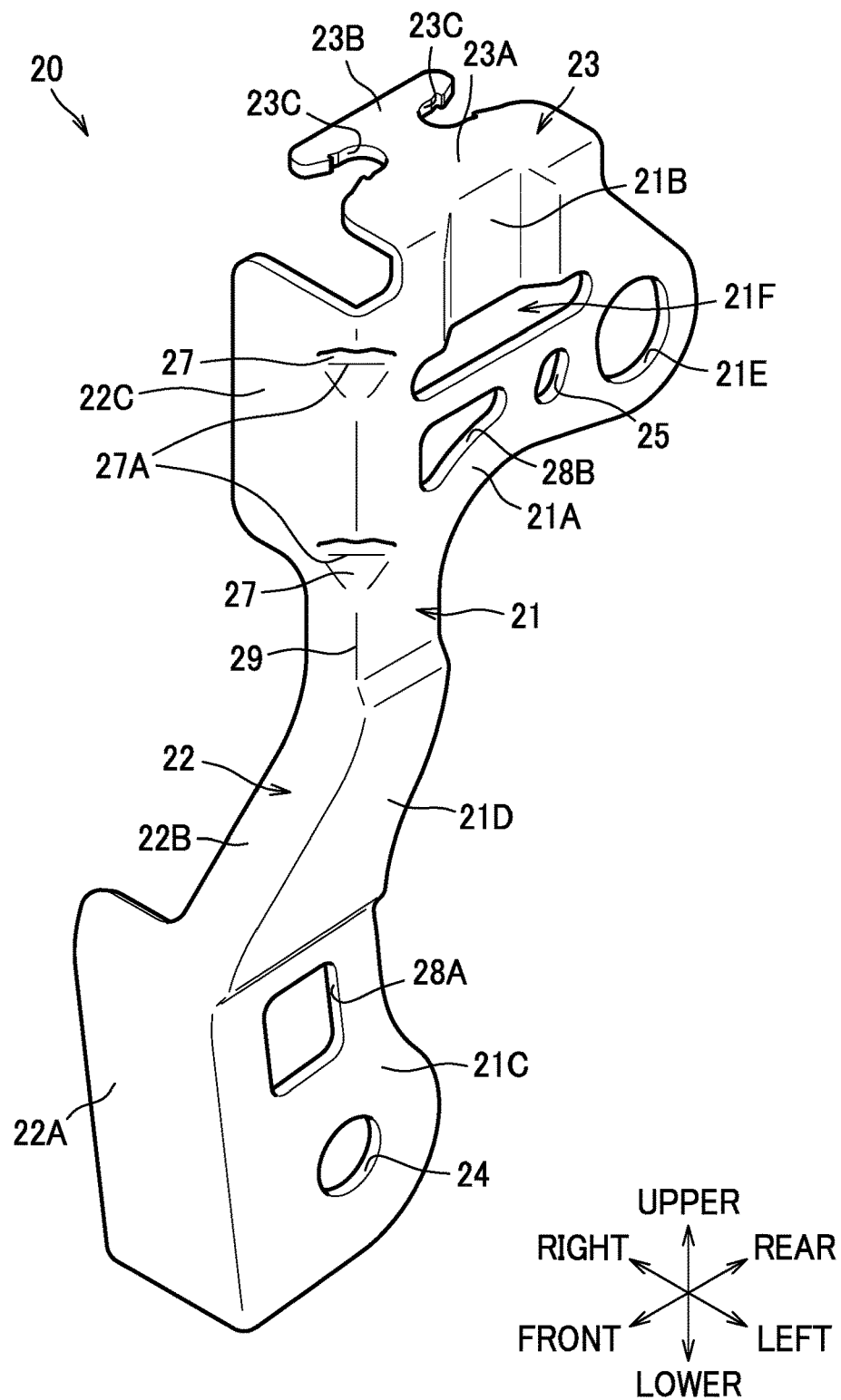
FIG. 3 is a perspective view of a second body.

As shown in FIG. 3, the second body 20 includes an engageable hole 25 as a coupling portion coupled to the first body 10 and a second support hole 24 as a second support portion by which another end of the shaft member 53 is supported. The second body 20 is configured to include a first wall 21 extending in a direction perpendicular to the axial direction to connect the engageable hole 25 and the second support hole 24, and a second wall 22 extending in a direction along the axial direction from the first wall 21 at a side of the first wall on which the one end of the shaft member 53 is disposed (i.e., toward rightward). The other end (i.e., left end) of the shaft member 53 is hammered or pressed to rivet the first body 10 and the second body 20 together.

From an upper end of the first wall 21, a cable hook 23 to which the end portions of the outer cables 8B are hooked extends in a direction along the axial direction at the side of the first wall on which the one end of the shaft member 53 is disposed (i.e., toward rightward). The cable hook 23 includes an extension portion 23A extending from the first wall 21, and a second extension portion 23B further extending from the extension portion 23A rightward along the axial direction in the shape of the letter T. Between the extension portion 23A and the second extension portion 23B are provided two notches 23C in which the end portions of the outer cables 8B are hooked and through which the inner cables 8A are disposed.

The first wall 21 includes a first portion 21A in which the engageable hole 25 is formed, and a second portion 21B provided between the first portion 21A and the cable hook 23 which second portion is recessed from the first portion 21A into the side on which the one end of the shaft member 53 is disposed (i.e., toward rightward). The first wall 21 further includes a third portion 21C in which the second support hole 24 is formed, and a bulging portion 21D by which the first portion 21A and the third portion 21C are connected; the bulging portion 21D is configured to bulge leftward relative to the first portion 21A and the third portion 21C.

The opening 21F is formed between the first portion 21A and the second portion 21B. The right-side surface of the first portion 21A and the left-side surface of the second portion 21B are spaced apart by the thickness of the first body 10, whereby the opening 21F defines a vertically extending hollow space in which the second protrusion 17B of the first body 10 as engaged therein is disposed between the first portion 21A and the second portion 21B.

The engageable hole 25 is an elongate hole having a length (longer dimension) in a direction of a line produced from the second support hole 24 to the engageable hole 25, and a width thereof conforms to a diameter of the first protrusion 17A of the first body 10. With this configuration, engagement of the engageable hole 25 with the first protrusion 17A causes the first body 10 to get restrained from rotating about the shaft member 53 (second support hole 24).

At a rear side of the engageable hole 25, a mounting hole 21E is provided as a second mounting portion. The mounting hole 21E is formed in such a shape and a position as to substantially conform to those of the mounting hole 17C of the first body 10. It should be noted that the one side of the receptacle notch 11A (i.e., lower side, in the present embodiment) in the second body 20 includes no mounting portion with which a bolt 2 for attachment of the latch device 1 for a vehicle to the seat frame S is engageable.

The first wall 21 has lightening holes 28A, 28B provided to reduce its weight. The lightening hole 28A is disposed above the second support hole 24 in the third portion 21C; the lightening hole 28B is disposed frontward of the engageable hole 25 in the first portion 21A.

The second wall 22 extends from the first wall 21, over a range from the lower end of the third portion 21C of the first wall 21 approximately to the upper end of the first portion 21A of the first wall 21. In other words, as shown in FIG. 4, the second wall 22 extends from the first wall 21 throughout an entire region between a first plane P1 and a second plane P2, where the first plane P1 is perpendicular to a straight line L1 (that is a line passing through the engageable hole 25 and a center of the shaft member 53 as viewed in the axial direction) and passes through the center of the shaft member 53, and the second plane P2 is perpendicular to the straight line L1 and passes through the engageable hole 25. With this configuration, the L-shaped cross section is formed by the first wall 21 and the second wall 22 throughout the entire region ranging between the second support hole 24 and the engageable hole 25 at which the second body 20 is connected to the first body 10, so that the rigidity of the second body 20 can be ensured.

Referring back to FIG. 3, the second wall 22 includes a first sidewall portion 22A that is a portion extending from the third portion 21C of the first wall 21, a second sidewall portion 22B that is a portion extending from the bulging portion 21D and a lower portion of the first portion 21A, and a third sidewall portion 22C that is a portion on an upper side of the second sidewall portion 22B and extends from the first portion 21A of the first wall 21. The first sidewall portion 22A and the third sidewall portion 22C are formed with widths greater than that of the second sidewall portion 22B. The second wall 22 is so bent that a portion thereof from the second sidewall portion 22B to the third sidewall portion 22C is recessed rearward (also see FIG. 4).

In an edge 29 formed by intersection of the first wall 21 and the second wall 22, a plurality of recesses 27 are formed (two recesses are provided herein by way of example). A bottom 27A of each recess 27 extends to connect the first wall 21 and the second wall 22, thereby providing reinforcement which serves to keep the second wall 22 from folding down relative to the first wall 21.

As shown in FIG. 2, the hook 30 includes a main body 31 stamped out of a thick plate of metal, a covering 32 made of plastic to cover the main body 31, and a pin 37.

The hook 30 has a through hole 33 formed for the shaft member 53 to be disposed therethrough, and is rotatably supported by the first body 10 and the second body 20 via the shaft member 53. The hook 30 has a first engageable notch 34A and a second engageable notch 34B provided as an engageable notch engageable with the striker 4. The first engageable notch 34A and the second engageable notch 34B are both configured to open toward downward, and entrances 38A, 38B through which the striker 4 comes therein are disposed at their lower ends. The first engageable notch 34A is disposed at a distance from the through hole 33, while the second engageable notch 34B is disposed closer to the through hole 33 than the first engageable notch 34A is.

The hook 30 includes a spring rest portion 35 in which a second arm 51C of the torsion spring 51 is engageable, which spring rest portion is formed under the through hole 33. An end face 36 at a rear side of the hook 30, a side located farthermost from the through hole 33 of the hook 30 is an oblique surface descending toward the through hole 33. The pin 37 is a portion engageable with the lever member 40, and so provided at an upper portion of the hook 30 as to protrude rightward. Three lightening holes 39 are formed in the hook 30 as through holes for weight reduction.

The lever member 40 is a member engageable with the hook 30 to cause the hook 30 to rotate, and is disposed adjacent the right side of the hook 30. The lever member 40 includes a cable engageable portion 41 made of metal and a lever portion 42 made of plastic which is formed integrally with the cable engageable portion 41 by insert molding. The cable engageable portion 41 has a hole 41A in which the inner cable 8A of the cable 8 inserted therethrough is engageable. The lever portion 42 has a bearing hole 43, and the pin 54 is press fitted in the bearing hole 43. As described above, the pin 54 is supported by the first body 10, and the lever member 40 is thereby rotatably supported through the pin 54 by the first body 10.

The lever portion 42 has a first engageable surface 42A extending away from the bearing hole 43, and a second engageable surface 42B continuous with the first engageable surface 42A, which second engageable surface is a cylindrical surface whose center of curvature generally coincides with that of the bearing hole 43. The second engageable surface 42B is a curved surface whose distance from the bearing hole 43 getting slightly greater with distance from the first engageable surface 42A. The lever portion 42 includes a spring rest portion 44 in which a second arm 52C of the torsion spring 52 is engageable, which spring rest portion is provided at a right-side surface of the lever portion 42.

The torsion spring 51 includes a coiled portion 51A, and the first arm 51B and the second arm 51C which extend from the coiled portion 51A. The first arm 51B is anchored on the first spring anchor portion 11D of the first body 10, and the second arm 51C is engaged on the spring rest portion 35 of the hook 30. With this arrangement, the torsion spring 51 is configured to constantly bias the hook 30 toward downward.

The torsion spring 52 includes a coiled portion 52A, and the first arm 52B and the second arm 52C which extend from the coiled portion 52A. The first arm 52B is anchored on the second spring anchor portion 11E of the first body 10, and the second arm 52C is engaged on the spring rest portion 44 of the lever member 40. With this arrangement, the torsion spring 52 is configured to bias the lever member 40 in a counterclockwise direction as viewed in FIG. 2. The lever member 40, when not operated, is brought into contact with the second spring anchor portion 11E by the biasing force of the torsion spring 52, and thereby located in place The latch device 1 for a vehicle configured as described above is rotatable about the shaft member 53 between a first position in which the hook 30 is engageable with the striker 4 as shown in FIG. 4 and a second position in which the hook 30 is disengageable from the striker 4 as shown in FIG. 6 (b). With this rotatable feature, the latch device 1 for a vehicle can be shifted to a locked state as shown in FIGS. 4, 6 (a) and 7 in which the striker 4 is engaged on the hook 30, and to an unlocked state as shown in FIGS. 5 (a), 5 (b), and 6 (b) in which the striker 4 is disengaged from the hook 30.

In a state where the hook 30 is in the first position as shown in FIG. 4, the first body 10 is disposed such that the entrance 38A of the first engageable notch 34A and the entrance 38B of the second engageable notch 34B are covered with the first body 10 from one side in the axial direction, i.e., from the right side. Accordingly, in the state where the hook 30 is in the first position, the striker 4 is restrained from coming out of the first engageable notch 34A or the second engageable notch 34B.

On the other hand, the second body 20 is configured such that the first engageable notch 34A and the second engageable notch 34B are not covered with the second body 20, but left uncovered in entirety, from another side in the axial direction, i.e., the left side, in the state where the hook 30 is in the first position.

In addition, the second body 20 is configured such that the first engageable notch 34A and the second engageable notch 34B are not covered with the second body 20, but left uncovered in entirety, from the another side in the axial direction, i.e., the left side, in the state where the hook 30 is in the second position as shown in FIG. 6 (b).

With this configuration in which the second body 20 is configured to have such a shape as almost failing to cover the other side of the hook 30, the second body 20 is downsized for effectuating weight reduction.

Operation of the latch device 1 for a vehicle configured as described above will be described hereafter.

As shown in FIG. 5 (a), when the seat back SB tilted to the front with the latch device 1 for a vehicle disengaged from the striker is turned rearward without operating the cable 8, a front rod-shaped portion 4A of the striker 4 is brought into contact with the end face 36 of the hook 30 in the first position. It is to be understood that, as well known in the art, the striker 4 comprises a metal wire shaped like a letter U, which includes a front rod-shaped portion 4A and a rear rod-shaped portion, as is the case with the striker fixed on the sidewall of the vehicle body 3.

When the rod-shaped portion 4A pushes the end face 36 of the hook 30, the hook 30 rotates upward by virtue of the inclination of the end face 36, as shown in FIG. 5 (b). When the rod-shaped portion 4A passes over a lower end 36A of a rear-side portion of the hook 30 (portion rearward of the first engageable notch 34A), the rod-shaped portion 4A is engaged with the first engageable notch 34A as shown in FIG. 6 (a). Accordingly, the latch device 1 for a vehicle enters the locked state. In this state, the hook 30 is in the first position.

Thereafter, if the seat back SB is to be further reclined rearward, the cable 8 is pulled, for example, by a lever or the like provided on the seat back SB, to cause the lever member 40 to turn upward. Then, the lever member 40 is brought into contact with the pin 37 of the hook 30 and pushes the pin 37 upward, to thereby cause the hook 30 to turn upward as shown in FIG. 6 (b). When the hook 30 moves up to a position in which the rod-shaped portion 4A is movable inside the receptacle notch 11A, the hook 30 is located in the second position.

Figure 7:
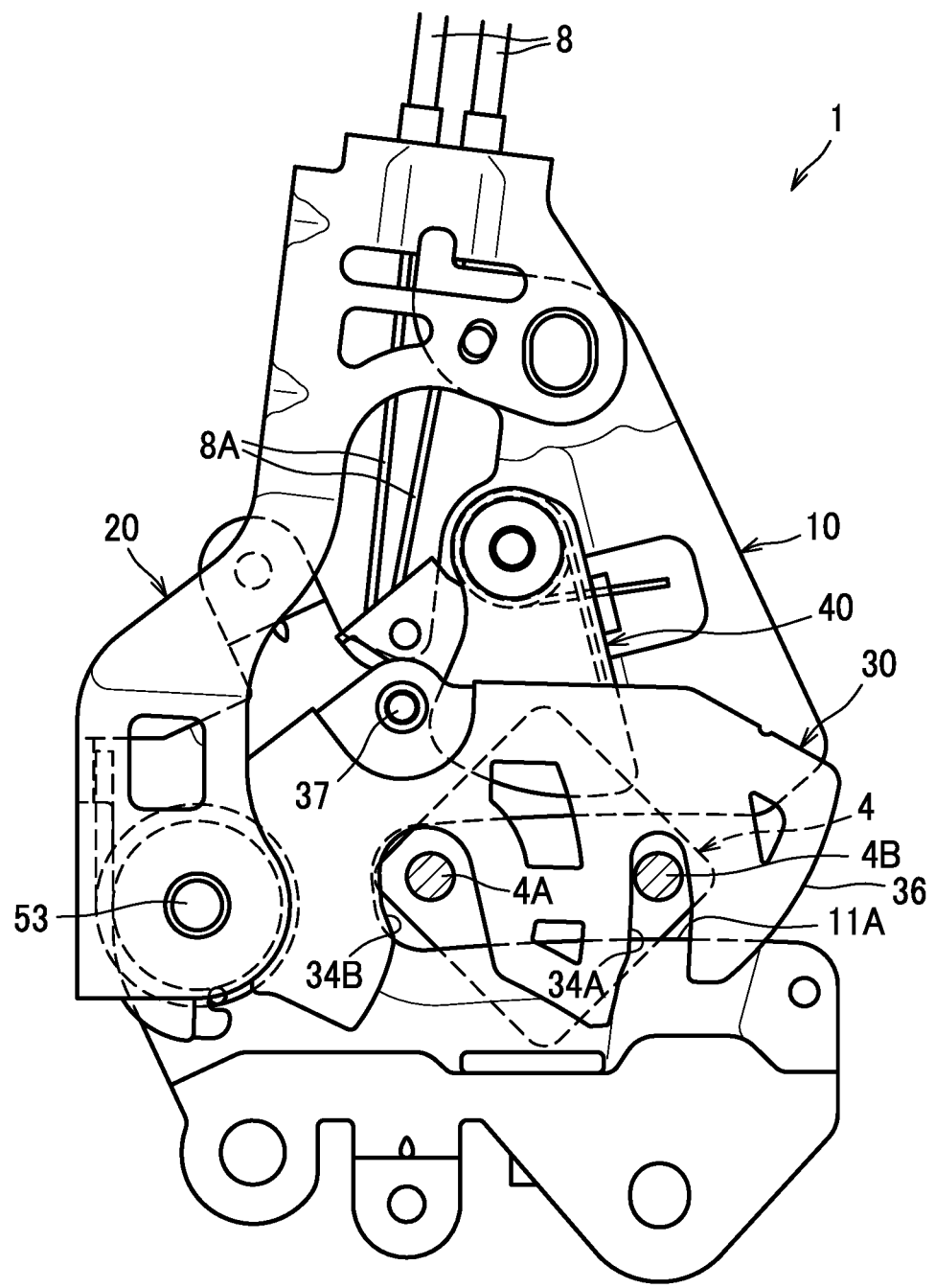
FIG. 7 is a view for explaining an operation of the latch device for a vehicle.

When the hook 30 is located in the second position, the seat back SB may be reclined rearward, to cause the rod-shaped portion 4A of the striker 4 to move deep into the receptacle notch 11A. In this state, when the cable 8 is returned, the hook 30 is located in the first position, and the rod-shaped portion 4A is engaged in the second engageable notch 34B, as shown in FIG. 7. In addition, the rear rod-shaped portion 4B of the striker 4 is engaged in the first engageable notch 34A. Accordingly, the latch device 1 for a vehicle is back in the locked state.

If the seat back SB is to be tilted frontward from the locked state shown in FIG. 6 (a) or FIG. 7, the cable 8 is pulled by the lever or the like, and the hook 8 is pulled up to the second position as shown in FIG. 6 (b). Thereby, the rod-shaped portions 4A, 4B of the striker 4 are made movable as desired inside the receptacle notch 11A, so that the seat back SB can be tilted frontward.

With the latch device 1 for a vehicle according to the present embodiment as described above, the following advantageous effects may be achieved.

The latch device 1 is small because the second body 20 is configured such that the first engageable notch 34A and the second engageable notch 34B are not covered with the second body 20, but left uncovered in entirety in the state where the hook 30 is in the first position; therefore, the latch device 1 for a vehicle can be made lighter in weight. Moreover, before the latch device 1 for a vehicle is mounted in the vehicle body 3, the assembly condition of the hook 30 or other parts can be visually inspected with increased ease.

Furthermore, since the second body 20 is configured such that the first engageable notch 34A and the second engageable notch 34B are not covered, but left uncovered in entirety, even in the state where the hook 30 is in the second position, the latch device 1 for a vehicle is not only provided with reduced weight but also with the feature of easy visual inspection of the operation of the hook 30 before the latch device 1 for a vehicle is mounted in the vehicle body 3 3.

Since a portion of the second body 20 at the lower side of the receptacle notch 11A includes no mounting portion with which a bolt 2 for attachment of the latch device 1 for a vehicle is engageable so that the second body 20 can be made smaller, the latch device 1 for a vehicle can be made lighter in weight. Even though the second body 20 fails to include a mounting portion at the lower side of the receptacle notch 11A, the mounting holes 13A, 13B and the mounting hole 17C provided in the first body 10 around the receptacle notch 11A are fastened to the seat frame S, so that the positions of the mounting holes 13A, 13B and the mounting hole 17C are fixed. In other words, a structure in which the seat frame S in combination with the first body 10 forms a housing of the latch device 1 for a vehicle is provided, and thus the latch device 1 for a vehicle can be made lighter in weight without sacrificing the rigidity and strength.

Furthermore, since the second body 20 has an L-shaped cross section formed by the first wall 21 and the second wall 22, the rigidity of the latch device 1 for a vehicle can be ensured regardless of the downsizing of the second body 20.

Moreover, since the second body 20 has an L-shaped cross section formed throughout the entire region ranging from the center of the shaft member 53 by which the second body 20 is connected to the first body 10 to the engageable hole 25, the rigidity of the latch device 1 for a vehicle can be ensured.

Since the plurality of recesses 27 are provided in the edge 29 formed by the first wall 21 and the second wall 22 to connect the first wall 21 and the second wall 22, the rigidity of the second body 20 can be enhanced.

Since the engageable hole 25 and the first protrusion 17A are engaged with each other, the relative positions of the first body 10 and the second body 20 can be restricted.

Since the second body 20 includes the second portion 21B recessed from the first portion 21A between the first portion 21A and the cable hook 23, the rigidity of the cable hook 23 on which a force is exerted from the outer cable 8B can be increased. Although the second body 20 has a narrower width in the midsection (i.e., the second sidewall portion 22B), the rigidity can be ensured in that the first wall 21 includes the bulging portion 21D provided in a position corresponding to the second sidewall portion 22B.

Assuming that a vehicle is rear-ended, a load is received by a middle portion of the second body 20 from an occupant as indicated by an arrow F in FIG. 4. Even when such a large load is received, the load is efficiently transmitted from the middle of the second body 20 to the two fastening points because the second body 20 is fixed to the side frame SF1 at the lower second support hole 24 and the upper mounting hole 21E; therefore, deformation of the housing 5 or falling off of the members can be restricted.

Since the second protrusion 17B is disposed in the opening 21F and sandwiched between the first portion 21A and the second portion 21B, the second body 20 is restricted relative to the first body 10 in the direction of thickness of the first wall 21; therefore, the rigidity of the housing 5 constructed of the first body 10 and the second body 20 can be enhanced.

Although one illustrative embodiment of the present invention have been described above, the present invention is not limited to the above-described embodiment, and can be changed or modified where appropriate for practicable applications.

For example, the second body 20 in the above-described embodiment has the mounting hole 21E provided at the upper side of the receptacle notch 11A, but the mounting hole 21E may not be provided. The second body 20 has been illustrated as failing to cover the first engageable notch 34A and the second engageable notch 34B and leave them uncovered, even in a state where the hook 30 is in the second position; however, the first engageable notch 34A and the second engageable notch 34B may be covered partly or in entirety with the second body 20 in the state where the hook 30 is in the second position.

Specific configuration of the engageable member is not limited to those described above; for example, the hook 30, though illustrated above as having two engageable notches, may be configured to have only one engageable notch. The hook 30 also may not include a covering 32.

In the above-described embodiment, bolts 2 are illustrated by way of example of a fastening member; however, the fastening member may be other members such as rivet, or the like.

In the above-described embodiment, the latch device 1 for a vehicle is fixed to the seat frame S, and the striker 4 is fixed to the vehicle body 3; but contrariwise, the latch device 1 may be fixed to the vehicle body 3, and the striker 4 may be fixed to the seat frame S. Moreover, the latch device 1 for a vehicle may be used to fix the seat cushion, or may be used to fix the other parts of the vehicle. Furthermore, its application may not be limited to an automobile, but may be employed in other type of vehicle such as a train, ship, aircraft, etc.

Furthermore, any of the elements explained in relation to the above-described embodiments and modified examples may be implemented in combination as desired.

The invention claimed is:

1. A latch device for a vehicle, comprising:
   an engageable member having an engageable notch engageable with a striker;
   a shaft member by which the engageable member is rotatably supported;
   a first body comprising:
     a first support portion by which one end of the shaft member is supported, and
     a first protrusion; and
   a second body comprising:
     an elongate engageable hole into which the first protrusion of the first body is insertable, and
     a second support portion by which another end of the shaft member is supported,
   wherein the engageable member is rotatable about the shaft member between a first position in which engagement with the striker is achievable and a second position in which disengagement from the striker is permitted,
   the first body is configured such that an entrance of the engageable notch through which the striker comes in the engageable notch is covered with the first body from one side in an axial direction of the shaft member in a state where the engageable member is in the first position, and
   the second body is configured such that the engageable notch is not covered with the second body, but left uncovered in entirety, from another side in the axial direction in the state where the engageable member is in the first position.

2. The latch device for a vehicle according to claim 1, wherein the engageable notch is not covered with the second body, but left uncovered in entirety, from said another side in the axial direction in a state where the engageable member is in the second position.

3. A latch device for a vehicle, comprising:
   an engageable member having an engageable notch engageable with a striker;
   a shaft member by which the engageable member is rotatably supported;
   a first body comprising a first support portion by which one end of the shaft member is supported; and
   a second body comprising:
     a coupling portion coupled to the first body, and
     a second support portion by which another end of the shaft member is supported, wherein
     the engageable member is rotatable about the shaft member between a first position in which engagement with the striker is achievable and a second position in which disengagement from the striker is permitted,
   the first body is configured such that an entrance of the engageable notch through which the striker comes in the engageable notch is covered with the first body from one side in an axial direction of the shaft member in a state where the engageable member is in the first position,
   the second body is configured such that the engageable notch is not covered with the second body, but left uncovered in entirety, from another side in the axial direction in the state where the engageable member is in the first position,
   the first body including a receptacle notch in which the striker is insertable, a first mounting portion with which a fastening member for attachment of the latch device for a vehicle is engageable, and a second mounting portion with which another fastening member for attachment of the latch device for a vehicle is engageable, the first mounting portion being disposed at one side of the receptacle notch as viewed in the axial direction, the second mounting portion being disposed at another side of the receptacle notch as viewed in the axial direction, and
   at least a portion of the second body at said one side of the receptacle notch includes no mounting portion with which a fastening member for attachment of the latch device for a vehicle is engageable.

4. The latch device for a vehicle according to claim 1, wherein the second body comprises a first wall extending in a direction perpendicular to the axial direction to connect the engageable hole and the second support portion, and a second wall extending in a direction along the axial direction from the first wall at a side of the first wall on which the one end of the shaft member is disposed.

5. The latch device for a vehicle according to claim 4, wherein the second wall extends from the first wall throughout an entire region between a first plane and a second plane, where, as viewed in the axial direction, the first plane is perpendicular to a straight line passing through the engageable hole and a center of the shaft member and passes through the center of the shaft member, and the second plane is perpendicular to the straight line and passes through the engageable hole.

6. The latch device for a vehicle according to claim 4, wherein the second body includes a plurality of recesses in an edge formed by the first wall and the second wall.

7. The latch device for a vehicle according to claim 4, wherein the first wall has the engageable hole.

8. The latch device for a vehicle according to claim 7, further comprising:
   a lever member engageable with the engageable member for use in causing the engageable member to rotate,
     wherein the lever member is provided with a cable comprising an inner cable and an outer cable through which the inner cable is disposed, the lever member comprising a cable engageable portion configured to allow the inner cable to be engaged therewith,
     wherein the second body comprises a cable hook to which an end portion of an outer cable is hooked,
     wherein the cable hook extends in a direction along the axial direction from the first wall at the side of the first wall on which the one end of the shaft member is disposed, and
     wherein the first wall comprises:
       a first portion in which the engageable hole is formed; and
       a second portion provided between the first portion and the cable hook, the second portion being recessed from the first portion into the side on which the one end of the shaft member is disposed.

9. The latch device for a vehicle according to claim 8,
wherein the second body has an opening provided between the first portion and the second portion, and
wherein the first body comprises a second protrusion disposed in the opening, and is disposed between the first portion and the second portion.

10. The latch device for a vehicle according to claim 1, wherein the engageable hole has a length in a direction of a line produced from a center of the shaft member to the engageable hole, and a width conforming to a diameter of the first protrusion.

* * * * *